United States Patent
Noda et al.

(10) Patent No.: US 7,282,299 B2
(45) Date of Patent: Oct. 16, 2007

(54) SOLID ELECTROLYTE BATTERY

(75) Inventors: Kazuhiro Noda, Kanagawa (JP);
Toshikazu Yasuda, Tokyo (JP);
Takeshi Horie, Kanagawa (JP)

(73) Assignee: Sony Corporation, Tokyo (JP)

( * ) Notice: Subject to any disclaimer, the term of this patent is extended or adjusted under 35 U.S.C. 154(b) by 201 days.

(21) Appl. No.: 10/131,697

(22) Filed: Apr. 24, 2002

(65) Prior Publication Data

US 2003/0044687 A1    Mar. 6, 2003

(30) Foreign Application Priority Data

Apr. 26, 2001 (JP) ............................ P2001-130193

(51) Int. Cl.
*H01M 4/62* (2006.01)
(52) U.S. Cl. .................. 429/217; 429/232; 429/231.5; 429/231.8; 429/231.4; 429/231.3; 429/221; 429/231.95; 429/231.1; 429/245; 429/247; 429/218.1
(58) Field of Classification Search .......... 429/217, 429/309, 232, 231.5, 231.4, 231.2, 231.8, 429/221, 231.95, 231.1, 245, 231.3, 218.1, 429/247
See application file for complete search history.

(56) References Cited

U.S. PATENT DOCUMENTS

| | | | | |
|---|---|---|---|---|
| 4,822,701 A | * | 4/1989 | Ballard et al. | 429/313 |
| 5,268,243 A | * | 12/1993 | Noda et al. | 429/317 |
| 5,527,639 A | * | 6/1996 | Noda et al. | 429/311 |
| 5,529,860 A | * | 6/1996 | Skotheim et al. | 429/213 |
| 5,620,811 A | * | 4/1997 | Zhang et al. | 429/217 |
| 5,814,420 A | | 9/1998 | Chu | |
| 5,985,487 A | | 11/1999 | Chaloner | |
| 6,245,458 B1 | * | 6/2001 | Sotomura | 429/218.1 |
| 6,355,378 B2 | * | 3/2002 | Kezuka | 429/217 |

FOREIGN PATENT DOCUMENTS

WO    WO99/33127    7/1999

OTHER PUBLICATIONS

European Search Report Corresponding To EP Ser No. 02009459.5; Jan. 30. 2007.

* cited by examiner

*Primary Examiner*—Laura Weiner
(74) *Attorney, Agent, or Firm*—Sonnenschein Nath & Rosenthal LLP

(57) ABSTRACT

A solid electrolyte battery includes a cathode having a cathode active material and a solid electrolyte and an anode. The solid electrolyte includes a first polymer having a binding force and a second polymer composed of alkali metal ion conducting polymers. Thus, the solid electrolyte battery has a high capacity and is excellent in its battery characteristics.

22 Claims, 1 Drawing Sheet

SOLID ELECTROLYTE BATTERY

RELATED APPLICATION DATA

The present application claims priority to Japanese Application(s) No(s). P2001-130193 filed Apr. 26, 2001, which application(s) is/are incorporated herein by reference to the extent permitted by law.

BACKGROUND OF THE INVENTION

1. Field of the Invention

The present invention relates to a solid electrolyte battery including a cathode having at least a cathode active material and a solid electrolyte and an anode.

2. Description of Related Art

In recent years, with the rapid development of portable electronic devices such as video cameras with video tape recorders, portable telephones, lap-top computers and so on, it has been demanded to more improve the performance of electrochemical devices as means for these electronic devices.

As the electrochemical device of a secondary battery, there has been hitherto employed liquid electrolyte (electrolyte solution) obtained by dissolving electrolyte salt in, for instance, water or organic solvent as a material for bearing an ionic conduction.

However, since liquid may possibly leak in the electrochemical device using the electrolyte solution, a sealing property needs to be ensured by using a metallic vessel. Therefore, the electrochemical device using the electrolyte solution includes various inconveniences that the weight becomes large, a sealing step is troublesome and a configuration is hardly freely designed.

Thus, as the material which bears the ionic conductivity of the electrochemical device, the study of, what is called a solid electrolyte made of a solid ionic conductor has been vigorously carried out.

Since the solid electrolyte does not have such an anxiety as to leak the liquid, the solid electrolyte is employed for the electrochemical device so that the sealing step for preventing the leakage of liquid can be simplified and the weight of the electrochemical device can be decreased. Further, when a solid polymer electrolyte including a polymer compound is employed as the solid electrolyte, since a polymer has an excellent film moldability, the electrochemical device whose configuration is extremely freely selected can be advantageously manufactured.

The solid electrolyte, particularly, the solid polymer electrolyte ordinarily comprises a matrix polymer and electrolyte salt capable of ionic dissociation. The matrix polymer has an ionic dissociation performance including both a function for solidifying the solid ionic conductor and a function as a solid solvent for the electrolyte salt.

As for such a solid electrolyte, for example, Armond et al. of Grenoble University (France) reported in 1978 that the ionic conductivity of about $1 \times 10^{-7}$ S/cm in the solution having lithium perchlorate dissolved in polyethylene oxide was obtained. Since then, a variety of polymer materials mainly including polymers having polyether bonds have been eagerly examined.

What is called, a solid polymer electrolyte battery has such a solid polymer electrolyte arranged between a cathode and an anode.

Generally, electrodes employed in a so-called lithium-ion secondary battery include, for instance, a coating type cathode, a coating type anode, a separator and electrolyte solution.

For instance, the coating type cathode is formed in such a manner that a cathode active material including $LiCoO_2$, a conducting assistant including graphite and a binding agent including polyvinylidene fluoride (abbreviated it as PVdF, hereinafter) are mixed together in the prescribed mixing ratio, the obtained mixture is dispersed in a solvent to obtain a composite mixture and the composite mixture is applied to a cathode current collector composed of an aluminum foil and the applied composite mixture is dried. Further, the anode is formed in such a manner that graphite and a binding agent including PVdF are mixed together in the prescribed mixing ratio, the obtained mixture is dispersed in a solvent to obtain a composite mixture, the composite mixture is applied on an anode current collector made of a copper foil and the applied composite mixture is dried.

In the cathode of the lithium-ion secondary battery, an electron conducting path is formed by the cathode current collector and the conducting assistant. The electrolyte solution permeates through the electrode so that an ion conducting path is formed. In the anode, an electron conducting path and an ion conducting path are formed in the same manner as that described above.

On the other hand, the electrodes of the above-described solid polymer electrolyte battery do not include liquid components and is composed of powder. Accordingly, the electron conducting paths of the electrodes of the solid polymer electrolyte battery are composed of current collectors and conducting assistants in a similar manner to that of a liquid type battery such as the above-described lithium-ion secondary battery.

However, since the electrolyte of the solid polymer electrolyte battery is solid-state, it is impossible to employ a method for penetrating electrolyte solution into the inner parts of electrodes as in the case of the lithium-ion secondary battery. Therefore, in the solid polymer electrolyte battery, ionic conducting paths are hardly formed and an internal resistance is seriously high. When the thickness of coating on the electrodes is more increased in order to increase a battery capacity, the above-described tendency becomes the more outstanding.

Thus, in order to overcome the above-described problem, is proposed an idea that the above-described solid polymer electrolyte is used as a binding agent for a composite mixture so as to bear both a function as a binding agent of a current collector, an active material and a conducting assistant and a function as an ionic conducting path.

The solid polymer electrolyte which contributes to the ion conducting paths in the electrodes needs to have a high ionic conductivity like, for instance, an SPE (Solid Polymer Electrolyte: solid electrolyte film as a separator).

It may be said that an amorphous polymer having a low glass transition point is generally suitably employed as the solid polymer electrolyte from the viewpoint of obtaining a high ionic conductivity. However, such an amorphous polymer has original properties that it is very soft and its melting point is low, so that the amorphous polymer is inferior in its function as a binding agent.

Therefore, when the amorphous polymer is used as the solid polymer electrolyte, a larger amount of amorphous polymer needs to be added to a composite mixture than a case in which the binding agent such as PVdF employed in, for instance, a liquid type battery is employed in order to satisfy a separation strength or the like required for electrodes. As a result, since the amount of an active material in the composite mixture is relatively decreased, there is a fear that a battery utilization factor, and further, a battery capacity may be deteriorated.

For improving the separation strength, it is proposed that the solid polymer electrolyte serving as the binding agent is chemically bridged. However, according to this method, a step for manufacturing a battery is inconveniently troublesome and an ionic conductivity is disadvantageously lowered due to the chemical bridging.

SUMMARY OF THE INVENTION

Thus, the present invention is proposed by taking these circumstances into consideration and it is an object of the present invention to provide a solid electrolyte battery showing a high capacity and excellent in its battery characteristics.

In order to achieve the above-described object, a solid electrolyte battery according to the present invention comprises a cathode having a cathode active material and a solid electrolyte and an anode, in which the solid electrolyte includes a first polymer having a binding force and a second polymer composed of alkali metal ion conducting polymers.

In the solid electrolyte battery constructed as described above, the first polymer included in the cathode serves as a binding agent between materials constituting the cathode, so that the cathode has a sufficient strength without increasing the content of the solid electrolyte. In addition, the second polymer is provided between the solid cathode active materials so that an ionic conducting path can be ensured in the cathode.

BRIEF DESCRIPTION OF THE DRAWINGS

The object and other objects and advantages of the present invention will become apparent more clearly from the following specification in conjunction with the accompanying drawings in which.

DETAILED DESCRIPTION OF THE PREFERRED EMBODIMENT

Now, referring to the accompanying drawings, a solid electrolyte battery to which the present invention is applied will be described in more detail.

Figure 1:
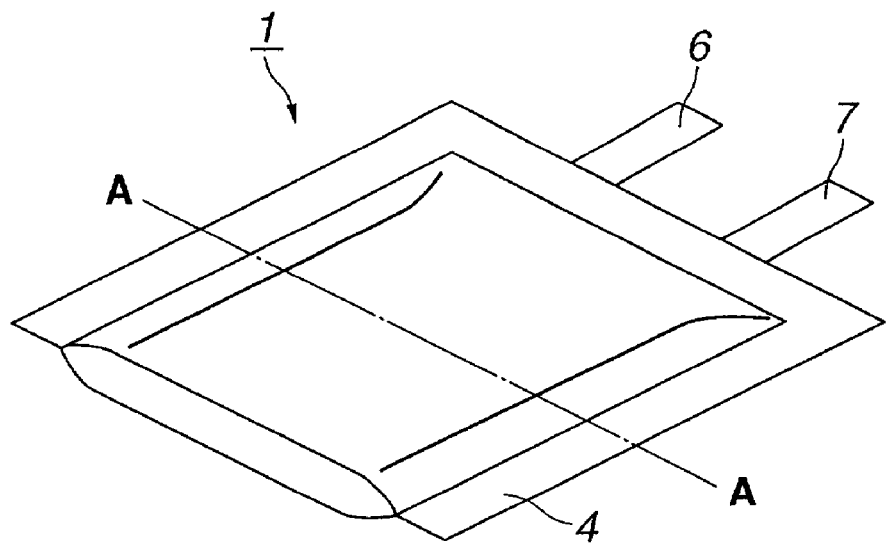
FIG. 1 is a perspective view showing one example of a solid electrolyte battery to which the present invention is applied.
Figure 2:
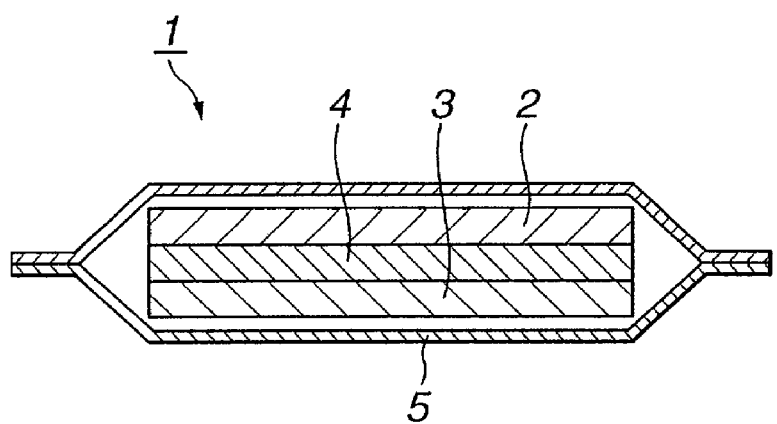
FIG. 2 is a sectional view taken along a line A—A of the solid electrolyte battery shown in FIG. 1.

The solid electrolyte battery to which the present invention is applied is shown in FIGS. 1 and 2. The solid electrolyte battery 1 is formed in such a manner that an electrode body obtained by laminating a cathode 2 and an anode 3 through a separator 4 is accommodated in an outer package material 5 using, for instance, a laminate film. Further, a cathode lead 6 is electrically connected to the cathode 2 and an anode lead 7 is electrically connected to the anode 3, respectively, and they are drawn outside the outer package material 5.

The cathode 2 has a cathode composite mixture layer formed on a cathode current collector.

As the cathode current collector, for instance, a metallic foil can be used. As specific metallic foil, there may be employed, for instance, an aluminum foil, a nickel foil, a stainless steel foil, etc. Further, as the metallic foil, a surface treated metallic foil or a porous metallic foil may be used in order to enhance an adhesive property to an electrode composite mixture layer. As the specific porous metallic foil, there may be exemplified punched metal, expanded metal, a metallic foil having many opening parts formed by an etching process, etc.

The cathode composite mixture layer comprises at least a cathode active material and a solid electrolyte.

The cathode active material is not limited to specific materials and any material which can be doped with and dedoped from alkali metal ions. For instance, the powder of metallic oxides or metallic sulfides may be employed depending on the types of desired batteries.

For example, when a lithium battery is formed, as the cathode active material, there may be employed the metallic oxides or the metallic sulfides including no lithium such as $TiS_2$, $MoS_2$, $NbSe_2$, $FeS$, $FeS_2$, $V_2O_5$, etc. In addition, as the cathode active material, there may be utilized lithium composite oxides or the like having as a main material $Li_xMO_2$ (in this formula, M designates one or more transition metal elements. Further, x is different depending on the charged or discharged state of the battery and is ordinarily located within a range of 0.05 or larger and 1.10 or smaller.) or $LiNi_pM1_qM2_rMO_2$ (in this formula, M1 and M2 designates at least one kind of element selected from a group including Al, Mn, Fe, Co, Ni, Cr, Ti and Zn. Otherwise, M1 and M2 may be non-metallic elements such as P, B, etc. Further, p, q and r satisfy a condition expressed by p+q+r=1).

The transition metals M constituting the above-described lithium composite oxides preferably include Co, Ni, Mn or the like. More specifically, there may be enumerated $LiCoO_2$, $LiNiO_2$, $LiNi_yCo_{1-y}O_2$ (in the formula, y satisfies a condition expressed by 0<y<1), etc. Since high voltage and high energy density and excellent cyclic characteristics can be obtained from lithium cobalt oxides or lithium nickel oxides, the lithium cobalt oxides or the lithium nickel oxides are preferably employed.

It is to be understood that a plurality of kinds of the above-described materials may be mixed together and the obtained mixture may be used as the cathode active material.

The cathode 2 includes the above-described cathode active material and the solid electrolyte. According to the present invention, the solid electrolyte comprises a first polymer having a binding force and a second polymer composed of alkali metal ion conducting polymers.

The first polymer of the solid electrolyte serves as a binding agent between, for example, the cathode active material, a conducting assistant and the cathode current collector which constitute the cathode 2, so that the adhesive strength of the respective cathode materials is increased. As a result, the cathode 2 is excellent in its separation strength.

Further, since the second polymer of the solid electrolyte is composed of the alkali metal ion conducting polymer, the second polymer is interposed between the powdered cathode active materials so that it forms an ionic conducting path in the cathode 2.

That is, both the first polymer and the second polymer are employed as the solid electrolyte in the cathode 2, so that the separation strength of the cathode 2 can be ensured with a small amount of solid electrolyte. Therefore, the charging rate of the cathode active material in the cathode 2 can be relatively enhanced. Thus, the solid electrolyte battery 1 to which the present invention is applied has a high battery utilization factor and realizes a high capacity. In addition thereto, since the ionic conducting path in the cathode 2 is ensured, the deterioration of battery characteristics such as cyclic characteristics resulting from, for instance, the increase of internal resistance can be suppressed.

Further, since uniform and sufficient ionic conducting paths are formed to the interior of the cathode, the thickness of a cathode composite mixture layer can be increased and the battery capacity can be more increased.

As the specific first polymer, can be employed a polymer showing a satisfactory binding force with a small amount thereof. As such polymers, there may be exemplified, polyvinylidene fluoride (PVdF), polytetrafluoro ethylene (PTFE), styrene-butadiene rubber (SBR), etc.

As the second polymer, the alkali metal ion conducting polymers, that is, the polymer functioning as the ionic conducting path in the cathode composite mixture layer can be employed. As the above-described polymer, for instance, there may be preferably used a complex including ether polymer having a constructional unit of ethylene oxide shown by a below described structural formula (1) and electrolyte salt.

[Structural Formula (1)]

Further, as the second polymer, there may be preferably employed a complex including a random copolymer whose principal chain structures have a constructional unit shown by a below described structural formula (2) and a constructional unit shown by a below described structural formula (3) and electrolyte salt. The random copolymer having the constructional unit shown by the structural formula (2) and the constructional unit shown by the structural formula (3) is used so that a higher ionic conductivity can be realized due to the presence of free end side chains. Still further, as the second polymer, may be employed an independent polymer of them or the polymer blend of the random copolymers.

[Structural Formula (2)]

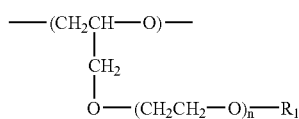

(In the above described formula, $R_1$ designates a group selected from a group including an alkyl group the number of carbons of which is 1 to 12, an alkenyl group the number of carbons of which is 2 to 8, a cycloalkyl group the number of carbons of which is 3 to 8, an aryl group the number of carbons of which is 6 to 14, an aralkyl group the number of carbons of which is 7 to 12 and a tetrahydropyranyl group. n indicates integers of 1 to 12.)

[Structural Formula (3)]

(In the above described formula, $R_2$ designates a group or atoms selected from a group including hydrogen atoms, an alkyl group, an alkenyl group, a cycloalkyl group and an aryl group and an allyl group.)

Further, the second polymer preferably has a glass transition point measured by a differential scanning calorimetry: DSC which is −60° C. or lower. Thus, the further higher ion conductivity can be realized. When the glass transition point exceeds −60° C., a satisfactory ionic conductivity cannot be obtained, and accordingly, there exists a fear that good battery characteristic cannot be obtained.

In this case, the differential scanning calorimetry is carried out at the rate of temperature rise of 10° C./minute within a scanning range of −150° C. to 80° C.

The electrolyte salt to be dissolved in the above-described solid electrolyte is not particularly limited to specific electrolyte salt and any electrolyte salt showing the ionic conductivity may be employed. For instance, there may be utilized conventionally known lithium salts such as lithium hexafluorophosphate ($LiPF_6$), lithium perchlorate ($LiClO_4$), lithium hexafluoroarsenate ($LiAsF_6$), Lithium tetrafluoroborate ($LiBF_4$), lithium trifluoromethane sulfonate ($LiCF_3SO_3$), lithium bis(trifluoromethylsulfonyl) imide ($LiN(CF_3SO_2)_2$), etc. Further, the above-described electrolyte salts may be independently used or two or more kinds of electrolyte salts may be mixed together and the mixture may be used. Besides, alkali metallic salt except lithium such as sodium may employed as the electrolyte salt.

Further, the cathode 2 preferably includes the conducting assistant as well as the cathode active material and the above-described solid electrolyte. Thus, the electronic conductivity of the cathode active material and the current collector or the like can be improved. In other words, the cathode 2 includes the conducting assistant so that the electronic conductivity in the cathode 2 can be improved. As the specific conducting assistant, conventionally well-known conducting assistants having the electronic conductivity can be employed. For example, graphite or the like can be employed.

As the anode 3, there may be employed conventionally well-known materials such as alkali metals, alloys capable of doping and dedoping from the alkali metals, or carbon materials capable of doping and dedoping from the alkali metals. More specifically, there are exemplified alkali metals such as lithium, sodium, etc. or alloys and carbon materials including the alkali metals or the like. As specific examples of the carbon materials, there may be enumerated pyrocarbons, coke, carbon black, vitreous carbons, organic polymer sintered bodies, carbon fibers, etc.

When a powdered anode active material is employed for the anode 3, a first polymer and a second polymer can be used in the anode 3 as a solid electrolyte in the same manner as that of the cathode 2.

As described above, in the solid electrolyte battery 1 according to the present invention, the cathode 2 includes the first polymer having the binding force and the second polymer composed of the alkali metal ion conducting polymers as the solid electrolyte in addition to the cathode active material and the conducting assistant. Thus, the cathode 2 has the complete separation strength and ensures the satisfactory ionic conductivity, even when the amount of the content of the solid electrolyte is very small. Accordingly, the solid electrolyte battery according to the present invention is excellent in its battery utilization factor so that it has a high capacity and excellent battery characteristics.

EXAMPLES

Now, specific Examples to which the present invention is applied will be described on the basis of experimental results.

Example 1

Initially, a cathode was manufactured as described below.

As a cathode active material, $LiCoO_2$ powder of 88 g having the average particle diameter of 5 μm, graphite powder of 6 g as a conducting assistant, polyvinylidene fluoride (PVdF) of 3 g as a first polymer and a second polymer of 3 g were mixed together in dehydrated N-methyl pyrrolidone (NMP) until they were uniformly mixed to prepare a slurry cathode composite mixture. The second polymer used here is a copolymer whose principal chain structures have a constructional unit shown by a below described structural formula (4) and a constructional unit shown by a below described structural formula (5) and employs LiTFSI (lithium bis(trifluoromethylsulfonyl) imide; LiN(CF$_3$SO$_2$)$_2$) as electrolyte salt. The second polymer is previously prepared so that the ratio Li to O is 0.06.

[Structural Formula (4)]

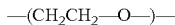

[Structural Formula (5)]

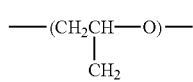

Then, the cathode composite mixture slurry prepared as mentioned above was applied to an aluminum foil having the thickness of 20 μm and dried under reduced pressure to remove N-methyl pyrrolidone (NMP). Then, the dried cathode composite mixture layer was cut into a long strip of 2×4 cm. The long strip was pressed under 500 kg/cm$^2$ to obtain a cathode. At this time, the thickness of the cathode composite mixture layer was 40 μm.

As a separator, modified acrylate of a random copolymer having a constructional unit shown by a below described structural formula (6) was used as a matrix and LiTFSI was used as electrolyte salt and acetonitrile solution was previously prepared so that the ratio Li to O was 0.06 was applied to a plate made of a fluoropolymer. An ultraviolet bridging was applied to the thus obtained plate to get a solid polymer electrolyte film. Further, this film was dried under vacuum at 60° C. for 24 hours. The thickness of the film at this time was 50 μm.

[Structural Formula (6)]

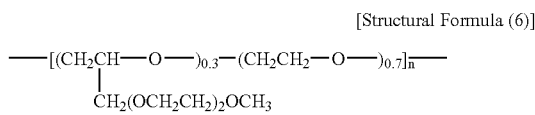

The solid polymer electrolyte film obtained in such a way was sandwiched in between a cathode and an anode made of metallic lithium and a cathode lead and an anode lead were respectively welded to the cathode and the anode. Then, the produced material was sealed in an aluminum laminate film to manufacture a solid electrolyte battery.

Comparative Example 1

A solid electrolyte battery was manufactured in the same manner as that of the Example 1 except that a second polymer was not used when a cathode composite mixture was prepared.

Comparative Example 2

A solid electrolyte battery was manufactured in the same manner as that of the Example 1 except that a first polymer was not used when a cathode composite mixture was prepared.

Then, the solid electrolyte batteries of the Example 1, the Comparative Example 1 and the Comparative Example 2 were respectively charged and discharged repeatedly so that capacity maintaining/retention ratios after 10th cycles and capacity maintaining/retention ratios after 30th cycles were respectively acquired.

Specifically, a constant-voltage and constant-current charging operation under the voltage of 4.2 V was initially carried out respectively for the solid electrolyte batteries. Then, a discharging operation was carried out for the respective solid electrolyte batteries under the conditions of finish voltage of 3.0 V and discharging current of 2 mA. This cycle was considered to be one cycle and a capacity relative to an initial discharging capacity when the charging and discharging operations were respectively carried out 20 times and 30 times was calculated as a capacity maintaining/retention ratio.

The obtained results after the 10th cycle and the 30th cycle of the charging and discharging operations are shown in a Table 1 illustrated below.

TABLE 1

| | Capacity Maintaining/retention Ratio | |
|---|---|---|
| | after 10th cycle (%) | after 30th cycle (%) |
| Example 1 | 87 | 78 |
| Comparative Example 1 | — | — |
| Comparative Example 2 | 45 | 7 |

As apparent from the Table 1, the battery of the Comparative Example 1 in which only the first polymer was included in the cathode as the solid electrolyte did not operate as the battery under the above-described charging and discharging conditions. Further, the battery of the Comparative Example 2 including only the second polymer as the solid electrolyte was extremely inferior both in the capacity maintaining/retention ratios after the 10th cycle and the 30th cycle to those of the battery of the Example 1.

As can be understood from these results, the solid electrolyte battery excellent in its battery characteristics could be realized by employing both the first polymer and the second polymer as the solid electrolyte in the cathode.

As apparent from the above description, the solid electrolyte battery according to the present invention utilizes both the first polymer and the second polymer as the solid electrolyte in the cathode so that a sufficient strength is given to the cathode with a small amount of solid electrolyte and an ion conductive path is formed. Therefore, according to the present invention, can be provided a solid electrolyte battery showing a high capacity and excellent in its battery characteristics without lowering the charging rate of the cathode active material.

What is claimed is:

1. A solid electrolyte battery comprising:
   a cathode including a cathode composite mixture, said mixture comprising a cathode active material and a solid electrolyte wherein said solid electrolyte comprises a first polymer and a second polymer;
   an anode; and
   a separator disposed between said cathode and said anode;
   wherein said first polymer has a binding force; and wherein said first polymer is selected from the group consisting of polyvinylidene fluoride, polytetrafluoro ethylene, styrene-butadiene rubber, and mixtures thereof; and wherein said second polymer is capable of conducting alkali-metal ions and comprises an electrolyte salt and a complex; and comprising one or more repeating structural units of formula II,

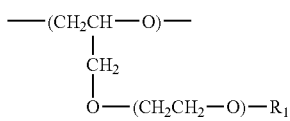

wherein n is an integer from 1 to 12; and wherein $R_1$ is selected from the group consisting of alkyl groups having 1 to 12 carbons, alkenyl groups having 2 to 8 carbons, cycloalkyl groups having 3 to 8 carbons, aryl groups having 6 to 14 carbons, aralkyl groups having 7 to 12 carbons, and tetrahydropyranyl groups.

2. The solid electrolyte battery according to claim 1, wherein the cathode further comprises a conducting assistant.

3. The solid electrolyte battery according to claim 2, wherein said conducting assistant is graphite.

4. The solid electrolyte battery according to claim 1, wherein the second polymer has a glass transition point of −60°C. or lower in accordance with a differential scanning calorimetry.

5. The solid electrolyte battery according to claim 1, wherein the cathode active material is a material capable of doping and dedoping from alkali metal ions.

6. The solid electrolyte battery according to claim 5, wherein said cathode active material is selected from the group consisting of metallic-oxide powders, metallic-sulfide powders, and mixtures thereof.

7. The solid electrolyte battery according to claim 6, wherein said cathode active material is selected from the group consisting of $TiS_2$, $MoS_2$, $NbSe_2$, $FeS$, $FeS_2$, $V_2O_5$, and mixtures thereof.

8. The solid electrolyte battery according to claim 6, wherein said cathode active material comprises $Li_xMO_2$ wherein M is an element selected from the group consisting of Co, Ni, and Mn, and wherein x is in a range from 0.05 to 1.10.

9. The solid electrolyte battery according to claim 6, wherein said cathode active material comprises $LiNi_p M1_q M2_r MO_2$ wherein M1 and M2 are each elements separately selected from the group consisting of Al, Mn, Fe, Co, Ni, Cr, Ti, Zn, P and B, and wherein p+q+r=1.

10. The solid electrolyte battery according to claim 1, wherein the anode comprises a material selected from the group consisting of alkali metals, alloys capable of doping and dedoping from alkali metals, carbon materials capable of doping and dedoping from alkali metals, and mixtures thereof.

11. The solid electrolyte battery according to claim 10, wherein said anode material is selected from the group consisting of lithium, sodium, pyrocarbon, coke, carbon black, vitreous carbon, organic polymer sintered bodies, carbon fiber, alloys thereof, and mixtures thereof.

12. The solid electrolyte battery according to claim 1, wherein said cathode further comprises a cathode current collector wherein said mixture is formed on said current collector.

13. The solid electrolyte battery according to claim 12, wherein said current collector comprises a metallic foil selected from the group consisting of aluminum foil, nickel foil, stainless steel foil, and mixtures thereof.

14. The solid electrolyte battery according to claim 1, wherein said solid electrolyte of said cathode is a first solid electrolyte and said anode further comprises a second solid electrolyte.

15. The solid electrolyte battery according to claim 14, wherein said second solid electrolyte of said anode is substantially the same as said first solid electrolyte of the cathode.

16. The solid electrolyte battery according to claim 1, wherein the complex of the second polymer further comprises one or more repeating structural units of formula III,

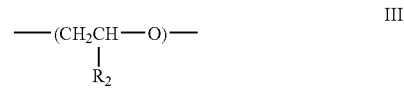

wherein $R_2$ is selected from the group consisting of hydrogen atoms, alkyl groups, alkenyl groups, cycloalkyl groups, aryl groups, and allyl groups.

17. The solid electrolyte battery according to claim 16, wherein said solid electrolyte of said cathode is a first solid electrolyte and said anode further comprises a second solid electrolyte.

18. The solid electrolyte battery according to claim 17, wherein said second solid electrolyte of said anode is substantially the same as said first solid electrolyte of the cathode.

19. The solid electrolyte battery according to claim 1, wherein said separator comprises a solid polymer electrolyte film.

20. The solid electrolyte battery according to claim 1, wherein the first polymer and the second polymer are present at a 1:1 ratio.

21. The solid electrolyte battery according to claim 1, wherein the first polymer is no more than 3% wt. of the cathode composite mixture.

22. The solid electrolyte battery according to claim 1, wherein the second polymer is no more than 3% wt. of the cathode composite mixture.

* * * * *